United States Patent
Nose (10) Patent No.: US 12,508,921 B2
(45) Date of Patent: Dec. 30, 2025

(54) CONTROL DEVICE FOR ELECTRIC VEHICLE

(71) Applicant: TOYOTA JIDOSHA KABUSHIKI KAISHA, Toyota (JP)

(72) Inventor: Mai Nose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 18/519,645

(22) Filed: Nov. 27, 2023

(65) Prior Publication Data

US 2024/0174088 A1    May 30, 2024

(30) Foreign Application Priority Data

Nov. 29, 2022   (JP) .................. 2022-190551

(51) Int. Cl.
*H02P 1/54*      (2006.01)
*B60L 3/00*      (2019.01)
*B60L 15/20*     (2006.01)

(52) U.S. Cl.
CPC ............. B60L 15/20 (2013.01); B60L 3/0084 (2013.01); *B60L 2240/421* (2013.01); *B60L 2240/423* (2013.01); *B60L 2260/46* (2013.01); *B60L 2270/145* (2013.01)

(58) Field of Classification Search
CPC .. H02P 5/46; H02P 21/18; H02P 23/04; H02P 6/10; H02P 21/05; H02P 21/20; B60L 15/20
See application file for complete search history.

(56) References Cited

U.S. PATENT DOCUMENTS

2022/0266846 A1    8/2022   Nose

FOREIGN PATENT DOCUMENTS

| CN | 110691710 A | * | 1/2020 | ............. B60L 50/60 |
| JP | 2014207778 A |   | 10/2014 | |
| JP | 2021110299 A |   | 8/2021 | |
| JP | 2021175279 A |   | 11/2021 | |
| WO | WO-2013157318 A1 | * | 10/2013 | ............... B60L 7/14 |

* cited by examiner

*Primary Examiner* — Karen Masih
(74) *Attorney, Agent, or Firm* — Hunton Andrews Kurth LLP (57) ABSTRACT

A control device includes a processor and a storage device, which stores a learned model learned through machine learning. The processor is configured to perform vibration suppression control for suppressing vibration caused by torsional resonance of a drive shaft when the electric vehicle is traveling on an uneven road. The learned model is a model that predicts a vertical load of the drive shaft after a specified time. In the vibration suppression control, the processor uses a prediction result obtained by the learned model to determine whether to perform speed-increasing correction or speed-decreasing correction and switches between the speed-increasing correction and the speed-decreasing correction to increase the rotation speed of the motor when the drive wheel is slipping on a road and decrease the rotation speed of the motor when the drive wheel is gripping the road.

5 Claims, 4 Drawing Sheets

CONTROL DEVICE FOR ELECTRIC VEHICLE

RELATED APPLICATION

The present application claims priority of Japanese Patent Application No. 2022-190551 filed on Nov. 29, 2022, the disclosure of which is hereby incorporated by reference herein in its entirety.

BACKGROUND

1. Field

The present disclosure relates to a control device for an electric vehicle.

2. Description of Related Art

Japanese Laid-Open Patent Publication No. 2014-207778 discloses that vibration of a vehicle body occurs due to torsional resonance of a drive shaft in an electric vehicle. Therefore, in an electric vehicle, vibration suppression control for suppressing vibration of the vehicle body is performed. In the vibration suppression control, the torque of the motor is controlled so as to suppress vibration caused by torsional resonance. The above patent publication describes that the control gain of the vibration suppression control is determined in accordance with the data of the rotation speed of the motor obtained when the wheel of the electric vehicle is in contact with the road.

When the vehicle travels on an undulated road, the vertical load of each wheel may fluctuate and the wheel may repeatedly slip on the road and grip the road. Therefore, vibration caused by torsional resonance cannot be effectively suppressed by vibration suppression control adapted to a state that the wheel is in contact with the ground.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a control device for an electric vehicle configured to drive a drive wheel with a motor. The control device includes a processor and a storage device that stores a learned model learned through machine learning. The processor is configured to perform vibration suppression control that suppresses vibration caused by torsional resonance of a drive shaft when the electric vehicle is traveling on an uneven road. The learned model is a model configured to predict a vertical load of the drive wheel after a specified time by executing a calculation using, as an input, time-series data for a specified period of explanatory variables including a rotation speed of the motor, a torque generated by the motor, and a rotation speed of the drive wheel. The processor, in the vibration suppression control, uses a prediction result obtained with the learned model to determine whether to perform speed-increasing correction for generating a positive torque with the motor or speed-decreasing correction for generating a negative torque with the motor. The processor, in the vibration suppression control, switches between the speed-increasing correction and the speed-decreasing correction based on the determination of whether to perform the speed-increasing correction or the speed-decreasing correction to increase the rotation speed of the motor when the drive wheel is slipping on a road and decrease the rotation speed of the motor when the drive wheel is gripping the road.

A further aspect of the present disclosure is a control device for an electric vehicle configured to drive a drive wheel with a motor. The control device includes a processor and a storage device that stores a learned model learned through machine learning. The processor is configured to perform vibration suppression control that suppresses vibration caused by torsional resonance of a drive shaft when the electric vehicle is traveling on an uneven road. The learned model is a model configured to predict whether the drive wheel is slipping on a road or gripping the road after a specified time by executing a calculation using, as an input, time-series data for a specified period of explanatory variables including a rotation speed of the motor, a torque generated by the motor, and a rotation speed of the drive wheel. The processor, in the vibration suppression control, uses a prediction result obtained with the learned model to determine whether to perform speed-increasing correction for generating a positive torque with the motor or speed-decreasing correction for generating a negative torque with the motor. The processor, in the vibration suppression control, switches between the speed-increasing correction and the speed-decreasing correction based on the determination of whether to perform the speed-increasing correction or the speed-decreasing correction to increase the rotation speed of the motor when the drive wheel is slipping on the road and decrease the rotation speed of the motor when the drive wheel is gripping the road.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a controller for a hybrid electric vehicle will be described in detail below with reference to the drawings.

Hereinafter, a control device 10, which is an embodiment of a control device for a vehicle, will be described with reference to FIGS. 1 to 7.

Configuration of Vehicle

Figure 1:
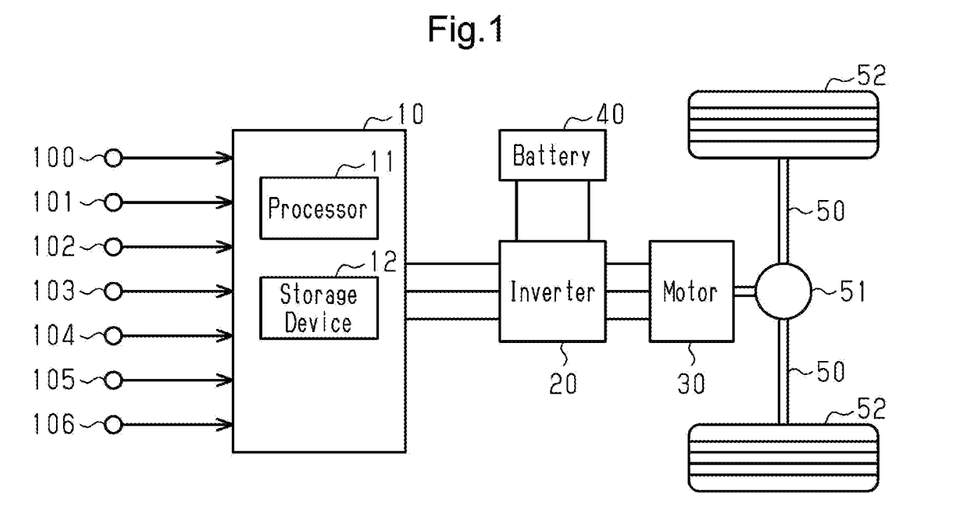
FIG. 1 is a block diagram showing a configuration of an electric vehicle.

As shown in FIG. 1, the vehicle, in which the control device 10 is installed, is an electric vehicle including a motor 30, serving as a driving force source. A rotation shaft of the motor 30 is connected to left and right drive wheels 52 via a differential 51 and a drive shaft 50.

The motor 30 is connected to an inverter 20. The inverter 20 is connected to a battery 40. Further, the inverter 20 is connected to a control device 10. The control device 10 includes a processor 11 and a storage device 12. The processor 11 includes a CPU and a memory, such as a RAM and a ROM. The memory stores program codes or instructions configured to cause the CPU to execute processes. The processor 11 generates a signal for controlling the inverter 20. The inverter 20 converts a direct current supplied from the battery 40 into an alternating current based on a signal received from the control device 10, and adjusts a current supplied to the motor 30.

The motor 30 is, for example, a three phase alternating-current motor, and generates a driving force with the alternating current supplied from the inverter 20. The driving force generated by the motor 30 is transmitted to the left and right drive wheels 52 via the differential 51 and the drive shaft 50. Further, the motor 30 generates a regenerative braking force when rotated by the drive wheels 52. As a result, kinetic energy of the vehicle is converted into electrical energy to charge the battery 40.

An accelerator position sensor 100, a first wheel speed sensor 101, and a second wheel speed sensor 102 are connected to the control device 10. An acceleration sensor 103, a current sensor 104, a rotation sensor 105, and a torque sensor 106 are also connected to the control device 10.

The accelerator position sensor 100 detects an accelerator operation amount ACCP. The first wheel speed sensor 101 detects a rotation speed $\omega t1$ of the right drive wheel 52, and the second wheel speed sensor 102 detects a rotation speed $\omega t2$ of the left drive wheel 52. The control device 10 calculates a mean value of the rotation speed $\omega t1$ and the rotation speed $\omega t2$ as a rotation speed $\omega t$. Further, the control device 10 calculates a vehicle speed V, which is a speed of the vehicle, based on the rotation speed $\omega t$.

The acceleration sensor 103 detects acceleration in the front-rear direction, the left-right direction, and the up-down direction of the vehicle, and the inclination of the vehicle. The current sensor 104 detects the current flowing through the motor 30. The rotation sensor 105 detects the rotation speed omg of the motor 30, and the torque sensor 106 detects the torque generated by the motor 30.

Control Device 10

For example, the processor 11 calculates the target value Tm of the torque based on the accelerator operation amount ACCP and the vehicle speed V. Then, the processor 11 calculates the target value of the current value supplied to the motor 30 based on the target value Tm and the rotation speed mg. The control device 10 drives the inverter 20 so as to realize the calculated target value of the current value.

Torsional Resonance

When the vehicle is traveling on an uneven road, the vertical load of the drive wheel 52 may fluctuate, and the drive wheel 52 may repeatedly slip on the road and grip the road. As a result, the drive shaft 50 may be repeatedly twisted thereby causing torsional resonance.

The torsional resonance will be described with reference to FIG. 2. When the drive wheel 52 slips, the rotation speed $\omega t$ of the drive wheel 52 increases, and the rotation speed $\omega t$ of the drive wheel 52 becomes higher than the rotation speed omg of the motor 30 as indicated by the solid-line arrows in FIG. 2. The difference between the rotation speed $\omega t$ and the rotation speed $\omega$mg causes torsion in the drive shaft 50.

Figure 2:
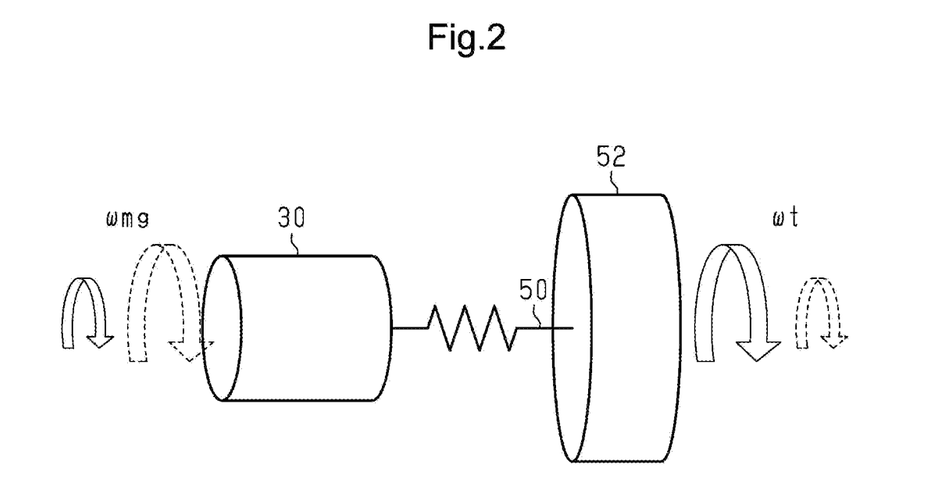
FIG. 2 is a schematic view illustrating torsion of a drive shaft when traveling on an uneven road.

As indicated by the broken-line arrows in FIG. 2, when the torsion is eliminated, the rotation speed $\omega$mg of the motor 30 increases after a lag, but when the drive wheel 52 grips the road, the rotation speed $\omega t$ of the drive wheel 52 decreases. Thus, the rotation speed $\omega t$ of the drive wheel 52 becomes lower than the rotation speed $\omega$mg of the motor 30, as indicated by the broken-line arrows in FIG. 2. The difference between the rotation speed $\omega t$ and the rotation speed $\omega$mg causes torsion in the drive shaft 50 acting in a direction opposite to that when slipping occurs.

When the vehicle is traveling on an uneven road and the drive wheel 52 repeatedly slips on the road and grips the road, torsion repeatedly occurs as described above. This may result in the occurrence of torsional resonance. The occurrence of torsional resonance increases the vibration amplitude of the drive shaft 50 and applies a large load to the drive shaft 50. Further, vibration of the vehicle increases.

Therefore, the control device 10 executes the torque-down control and the vibration-vibration suppression control when the vehicle is traveling on an uneven road. The torque-down control sets the torque of the motor 30 to be smaller than that when the vehicle is not traveling on the uneven road. The vibration suppression control switches between speed-increasing correction and speed-decreasing correction to increase the rotation speed $\omega$mg of the motor 30 when the drive wheels 52 are slipping and decrease the rotation speed $\omega$mg of the motor 30 when the drive wheels 52 are gripping the road.

Torque-Down Control

Figure 3:
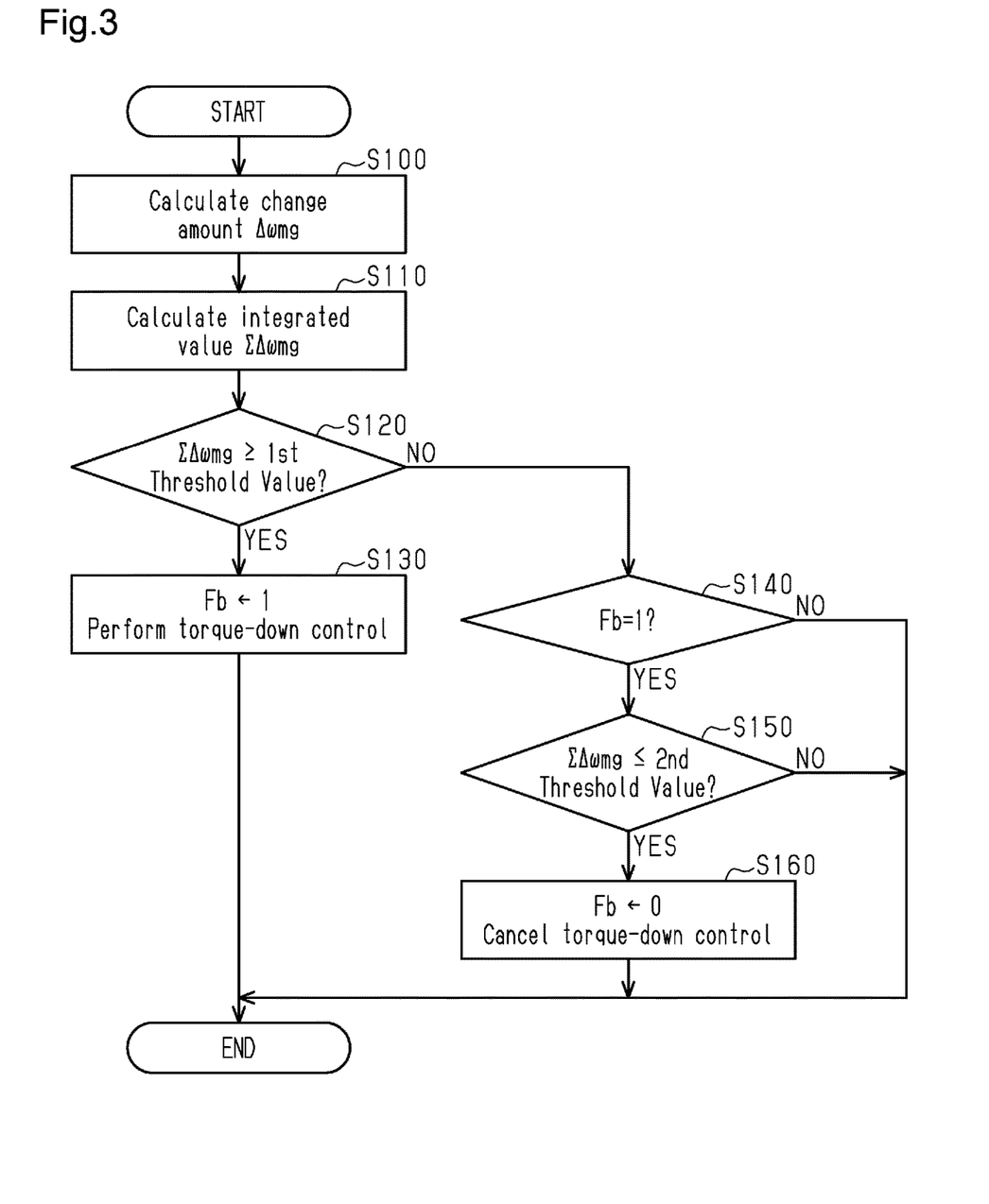
FIG. 3 is a flowchart showing a flow of processing relating to determination of an uneven road and torque-down control.

FIG. 3 is a flowchart showing a flow of processing in a routine related to the uneven road determination and the torque reduction control. The processor 11 of the control device 10 repeatedly executes the routine when the vehicle is traveling.

When this routine is started, the processor 11 calculates the change amount $\Delta\omega$mg of the rotation speed $\omega$mg of the motor 30 in the process of step S100. More specifically, the processor 11 subtracts the rotation speed $\omega$mg obtained in preceding routine from the rotation speed $\omega$mg obtained in the current routine to calculate the difference. The calculated difference is the change amount $\Delta\omega$mg.

In the processing of the next step S110, the processor 11 calculates an integrated value $\Sigma\Delta\omega$mg by integrating the absolute value of the change amount $\Delta\omega$mg most recently obtained during the specified period. To be specific, the processor 11 adds the absolute value of the change amount $\Delta\omega$mg calculated through the processing of step S100 to the integrated value $\Sigma\Delta\omega mg$ calculated in the preceding routine. Then, the processor 11 subtracts from the calculated value the absolute value of the change amount $\Delta\omega mg$ that was added to the integrated value $\Sigma\Delta\omega mg$ when performing this routine before the specific period. The difference calculated in this manner is a new integrated value $\Sigma\Delta\omega mg$. That is, the processor 11 repeatedly executes this routine to integrate the absolute value of the change amount $\Delta\omega mg$ most recently obtained during the specified period to calculate the integrated value $\Sigma\Delta\omega mg$. When the vehicle is traveling on an uneven road, the rotation speed $\omega mg$ of the motor 30 repeatedly increases and decreases as described with reference to FIG. 2. Therefore, the integrated value $\Sigma\Delta\omega mg$ becomes large. The integrated value $\Sigma\Delta\omega mg$ is an index value for determining whether or not the vehicle is traveling on an uneven road.

In the processing of the next step S120, the processor 11 determines whether or not the integrated value $\Sigma\Delta\omega mg$ is greater than or equal to a first threshold value. When the integrated value $\Sigma\Delta\omega mg$ is greater than or equal to the first threshold value, this indicates that the vehicle is traveling on an uneven road. The first threshold value is set to allow for determination that the vehicle is traveling on an uneven road and is based on results of experiments performed in advance.

In the process of step S120, when it is determined that the integrated value $\Sigma\Delta\omega mg$ is greater than or equal to the first reference value (step S120: YES), the processor 11 advances the process to step S130.

In the process of step S130, the processor 11 sets a flag Fb to "1" and performs the torque-down control. The flag Fb has an initial value of "0" and is set to "0" or "1." The flag Fb indicates that the vehicle is traveling on an uneven road when set to "1." The flag Fb indicates that the vehicle is not traveling on an uneven road when set to "0." The processor 11 performs the torque-down control when the flag Fb is "1."

The torque-down control decreases the torque of the motor 30 from that when the vehicle is not traveling on an uneven road. More specifically, in the torque-down control, the processor 11 sets an upper limit value for the target value Tm of the torque. The upper limit value is smaller than the target value Tm for when the processor 11 is not executing the torque-down control. In the torque-down control, the processor 11 limits the target value Tm to the upper limit value so that the torque of the motor 30 becomes smaller than that when the torque-down control is not executed. After executing the process of step S130 in this way, the processor 11 temporarily ends this routine.

In the process of step S120, when it is determined that the integrated value $\Sigma\Delta\omega mg$ is less than the first reference value (step S120: NO), the processor 11 advances the process to step S140.

In the process of step S140, the processor 11 determines whether or not the flag Fb is "1." If it is determined in the process of step S140 that the flag Fb is not "1" (step S140: NO), the processor 11 ends the routine without executing the torque-down control.

On the other hand, in the process of step S140, when it is determined that the flag Fb is "1" (step S140: YES), the processor 11 causes the process to proceed to step S150. Then, in the process of step S150, the processor 11 determines whether or not the integrated value $\Sigma\Delta\omega mg$ is less than or equal to a second threshold value. When the integrated value $\Sigma\Delta\omega mg$ is less than or equal to the second threshold value, this indicates that the vehicle is no longer traveling on an uneven road. The second threshold value smaller than the first threshold value. The second threshold value is set to allow for determination that the vehicle is not traveling on an uneven road and is set based on the results of experiments performed in advance.

In the process of step S150, when it is determined that the integrated value $\Sigma\Delta\omega mg$ is larger than the second reference value (step S150: NO), the processor 11 ends this routine. In this case, since the flag Fb remains to be "1", and the processor 11 continues to perform the torque-down control.

On the other hand, when it is determined in the process of step S150 that the integrated value $\Sigma\Delta\omega mg$ is less than or equal to the second reference value (step S150: YES), the processor 11 proceeds to the process of step S160. In the process of step S160, the processor 11 sets the flag Fb to "0" and cancels the torque reduction control. Then, the processor 11 temporarily ends the routine. When the integrated value $\Sigma\Delta\omega mg$ becomes less than or equal to the second reference value in this way, the control device 10 determines that traveling on an uneven road has ended and ends execution of the torque reduction control.

Vibration Suppression Control

Figure 4:
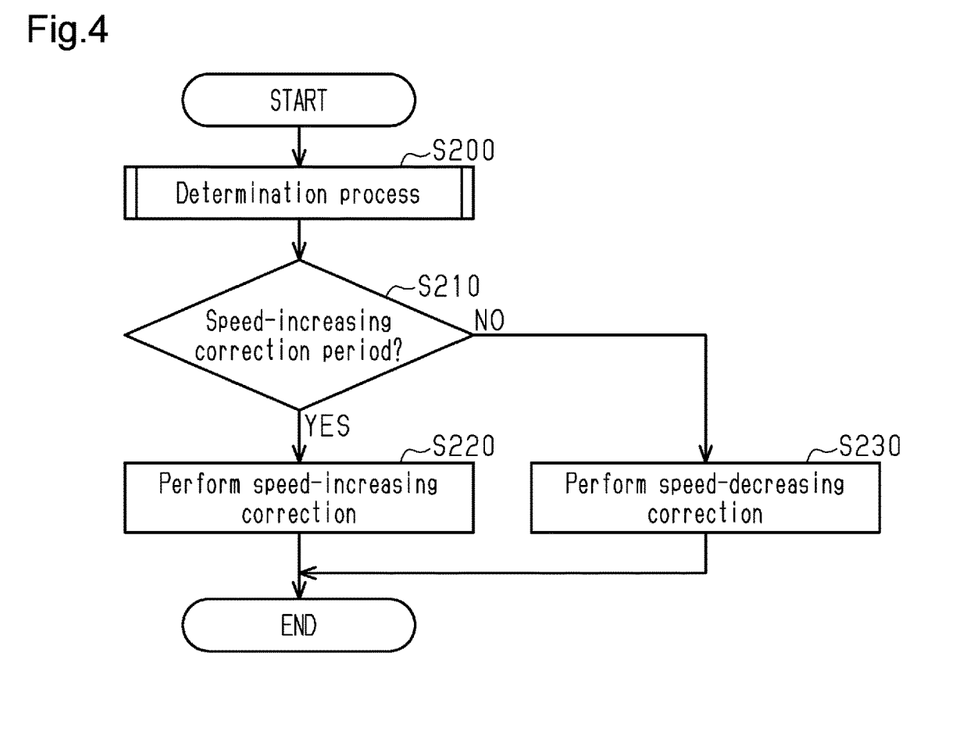
FIG. 4 is a flowchart showing a flow of processing related to vibration suppression control.

Next, the vibration suppression control will be described with reference to FIGS. 4 to 7. FIG. 4 is a flowchart illustrating a processing flow of a routine related to the vibration suppression control. This routine is repeatedly executed by the processor 11 when the flag Fb is set to "1".

As shown in FIG. 4, when this routine is started, the processor 11 performs a determination process in the process of step S200. The determination process is performed to determine whether the present time is a period for performing speed-increasing correction or a period for performing speed-decreasing correction.

In the control device 10, in the determination process, the processor 11 predicts the vertical load of the drive wheel 52 using the learned model. Then, the processor 11 predicts whether the drive wheel 52 will be slipping on the ground or gripping the road after a specified time based on the predicted vertical load. Further, the processor 11 determines whether the present time is an speed-increasing correction period in which the speed-increasing correction is performed or a speed-decreasing correction period in which a speed-decreasing correction is performed based on the prediction result. The specified time is a few milliseconds.

The storage device 12 of the control device 10 stores data of a learned model for predicting the vertical load of the drive wheel 52. The control device 10 uses a long short-term memory neural network that can handle the learned model as time-series data while retaining information transitioning along a time axis. The long short-term memory neural network is a so-called LSTM neural network. The LSTM neural network is one type of a recurrent neural network.

Figure 5:
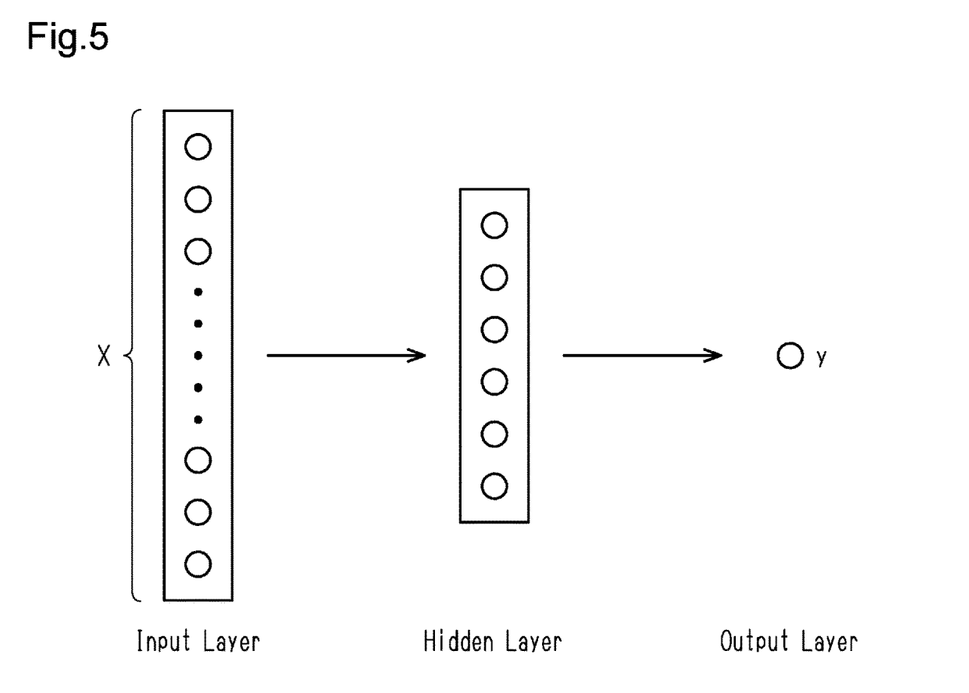
FIG. 5 is a schematic diagram of a neural network.

FIG. 5 shows a neural network constituting the LSTM neural network. FIG. 5 does not show transmission paths connecting nodes in adjacent layers. As shown at the left end of FIG. 5, the neural network includes an input layer having a plurality of nodes. The number of nodes in the input layer is equal to the number of explanatory variables constituting the input data X. The content of the input data X will be described later.

As shown at the right end of FIG. 5, the neural network includes an output layer composed of one node. The output layer outputs a vertical load y. The neural network further includes a hidden layer composed of a plurality of layers, each having a smaller number of nodes than the input layer, between the input layer and the output layer.

The activation function in the hidden layers of the neural network is, for example, a hyperbolic tangent. The number of layers in the hidden layer and the number of nodes in each layer of the hidden layer are hyperparameters that are adjusted and set at the design stage so that the vertical load y can be appropriately estimated.

In this neural network, an explanatory variable constituting input data X, which is time-series data of the explanatory variable, is input to an input layer so that a sum of values weighted according to each transmission path is input to an activation function. Further, an output value of the activation function is input to the next layer. By repeating such calculation, the vertical load y is finally output from the output layer.

The control device 10 uses the torque of the motor 30, the rotational speed omg of the motor 30, the acceleration in the vehicle front-rear direction, and the rotation speed ωt of the drive wheel 52 as explanatory variables for predicting the vertical load y of the drive wheel 52. In order to calculate the vertical load y of the drive wheel 52 after the specified time, the processor 11 generates the input data X from the data that was acquired over a specified time period before starting the present routine, that is, the processor 11 sets all the values of the explanatory variables acquired during the predetermined time period as the input data X. The length of the predetermined time period is, for example, several tens of milliseconds. When explanatory variables are acquired ten times during the predetermined time period, the input data X is a set of ten continuously acquired explanatory variables. More specifically, the input data X is a group of collected data X(1), which was first collected during the predetermined time period, to collected data X(10), which was last collected during the predetermined time period.

Each explanatory variable includes four types of information as described above. Therefore, each piece of collected data is a four dimensional vector including these four values. Therefore, in this case, the input layer of the neural network illustrated in FIG. 5 has four nodes.

Figure 6:
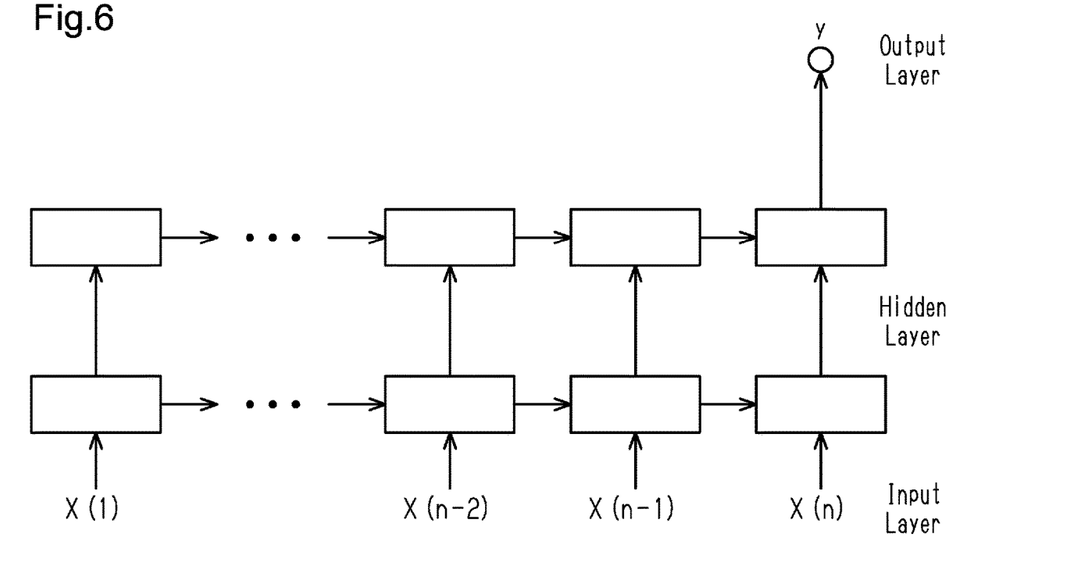
FIG. 6 is an explanatory diagram for explaining the concept of a long/short-term memory neural network.

FIG. 5 schematically illustrates a configuration of a recurrent neural network. In FIG. 6, an arrow extending in a vertical direction indicates a direction of forward propagation of the neural network illustrated in FIG. 5 to which an explanatory variable is input. In FIG. 6, "n" indicates a chronological order of the explanatory variable in the input data X.

The neural network, to which the collected data X(n) shown at the right end in FIG. 6 is input, uses the four-dimensional vector, which is the collected data X(n) as an input and outputs the vertical load y. In other words, in this case, the neural network receives the collected data X(10). The neural network is a fully connected neural network that forward-propagates the vertical load y to the output layer, which outputs the vertical load y.

As illustrated in FIG. 6, the hidden layer of the neural network to which the collected data X(10) collected last in the predetermined period is input reflects the output of the preceding hidden layer of the neural network receiving the collected data X(9) in the specified period.

As illustrated in FIG. 6, the hidden layer of the neural network to which the collected data X(9) is input reflects the output of the preceding hidden layer of the neural network receiving the collected data X(8) in the specified period.

The LSTM neural network is a neural network in which a mechanism called an LSTM block is provided in each hidden layer of such a recurrent neural network so that propagation of time-series information can be adjusted.

The learned model stored in the storage device 12 is subjected to supervised learning in advance by using the training data X_tr including information of actual measurement data of the vertical load of the drive wheel 52 detected by a sensor, which is generated from a test result conducted by driving a vehicle in advance, and the like. In order to collect data for generating the training data X_tr, a test vehicle provided with a sensor for measuring the vertical load of the drive wheel 52 is used. A large amount of data is collected by repeatedly driving the test vehicle is driven under various conditions such as on uneven roads.

Learning for updating the weights of the neural network is performed using the large amount of data collected in this way. A computer that performs learning generates training data X_tr based on the collected data and performs learning.

The training data X_tr is data in which measured data of a vertical load is included in a set of the above-described ten pieces of collected data The measured data of a vertical load included in the training data X_tr is measured data of a vertical load from when the specified period, during which the collected data included in the same training data X_tr is collected, ends to after the specified time.

When a large amount of training data X_tr is generated from the large amount of collected data, the computer inputs data of X(1) to X(10) corresponding to the input data X in the training data X_tr to the LSTM neural network to calculate the vertical load y.

The computer performs learning. Specifically, the computer adjusts the weight in the neural network so as to reduce the error between the calculated vertical load y and the actually measured vertical load, which is the correct answer label in the training data X_tr used for the calculation.

Then, the computer repeats the calculation of the vertical load y, using a large amount of the training data X_tr, and the adjustment of the weight. When the error of the vertical load y calculated using the LSTM neural network becomes sufficiently small, the computer determines that the learning is completed. Then, the computer stores the data of the learned LSTM neural network in the storage device 12 as the data of the learned model.

The data of the trained LSTM neural network whose weights have been adjusted in this way is stored in the storage device 12 of the control device 10.

While the vehicle is traveling, the processor 11 of the control device 10 repeats a process of inputting the input data X to the learned model and calculating the vertical load y after a specified time.

Figure 7:
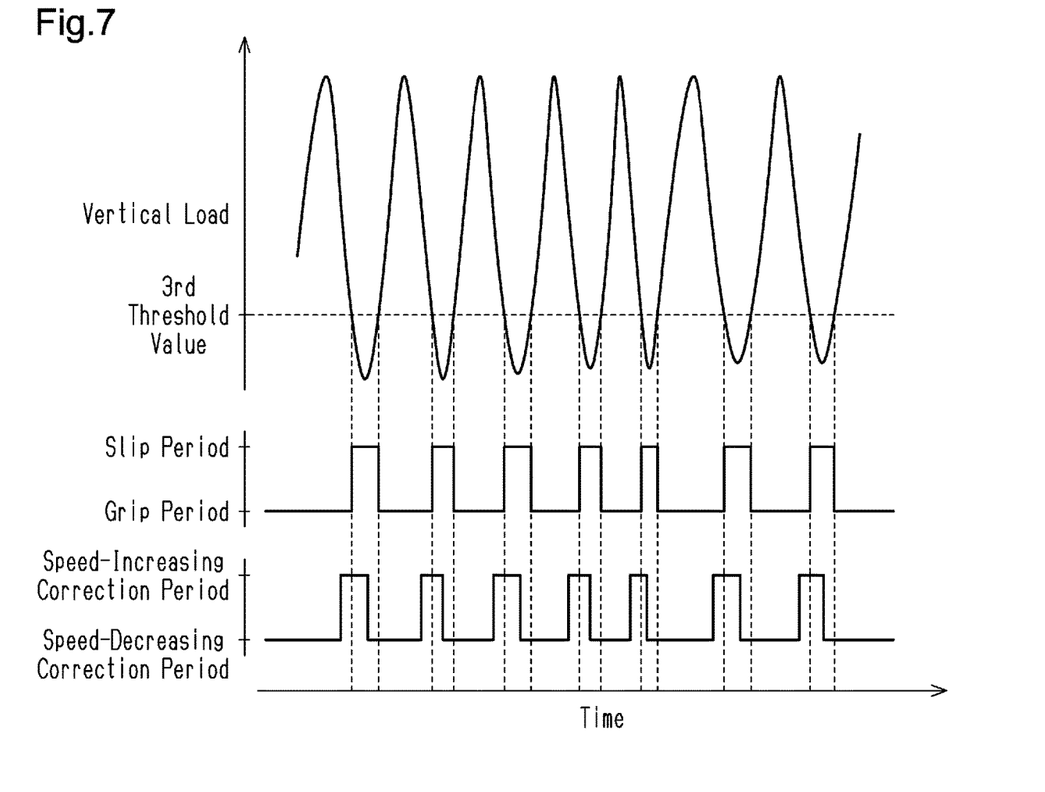
FIG. 7 is a timing chart showing the relationship of the switching timing for the speed-increasing correction and the speed-decreasing correction and the fluctuation of the vertical load.

Therefore, as shown in FIG. 7, the control device 10 has information on the transition of the vertical load y until the predetermined time elapses. In the determination process of step S200, the processor 11 determines whether the present period is the speed-increasing correction period in which the speed-increasing correction is performed or the speed-decreasing correction period in which the speed-decreasing correction is performed based on the information on the transition of the vertical load y until after the specified time.

Specifically, the processor 11 determines that a period in which the vertical load y is less than or equal to the third threshold value is a slip period in which the drive wheel 52 is slipping. Further, the processor 11 determines that a period in which the vertical load y is greater than the third threshold value is a grip period in which the drive wheel 52 is gripping the road.

The processor 11 sets the speed-increasing correction period to be slightly earlier than the slip period so that the positive torque can be generated in the motor 30 from when the slip period starts. The amount by which the start time point of the speed-increasing correction period is advanced from the start time point of the slip period is determined based on the results of experiments performed in advance. For example, the amount by which the start time point of the speed-increasing correction period is advanced from the start time point of the slip period is determined based on the length of the period from when the signal is transmitted from the control device 10 to when the torque is actually generated by the motor 30.

Similarly, the processor 11 sets the speed-decreasing correction period to be slightly earlier than the grip period so that the negative torque can be generated in the motor 30 from when the grip period starts. In this way, as shown in FIG. 7, the speed-increasing correction period and the speed-decreasing correction period are set alternately.

In the determination processing of step S200, the processor 11 determines whether the present routine is being executed in the speed-increasing correction period or the speed-decreasing correction period.

Then, as shown in FIG. 4, in the process of step S210, the processor 11 determines whether the result of the determination in the determination process is the speed-increasing correction period. When it is determined in the process of step S210 that the present routine is the speed-increasing correction period (step S210: YES), the processor 11 proceeds to the process of step S220. Then, in the process of step S220, the processor 11 performs the speed-increasing correction. Specifically, the processor 11 controls the inverter 20 by correcting the target value of the current value so as to cause the motor 30 to output a positive torque larger than the target value Tm. After the speed-increasing correction is performed in this way, the processor 11 temporarily ends this routine.

On the other hand, when it is determined that the present routine is not the speed-increasing correction period in the process of step S210 (step S210: NO), the processor 11 causes the process to proceed to step S230, and performs the speed-decreasing correction in the process of step S230. Specifically, the processor 11 controls the inverter 20 so as to cause the motor 30 to output a negative torque.

In this way, the control device 10 performs the torque reduction control and the vibration suppression control when traveling on an uneven road.

Operation of Present Embodiment

When the drive wheel 52 slips, the rotation speed ωt of the drive wheel 52 increases and becomes higher than the rotation speed ωmg of the motor 30 as indicated by the solid line arrow in FIG. 2. As a result, torsion occurs in the drive shaft 50. When the slipping drive wheel 52 grips the road, the rotation speed ωt of the drive wheel 52 decreases and becomes lower than the rotation speed ωmg of the motor 30 as indicated by the solid line arrow in FIG. 2. As a result, torsion occurs in the drive shaft 50. Torsional resonance is generated by the alternate occurrence of such torsion.

In the control device 10, the processor 11 switches and alternately performs the speed-increasing correction and the speed-decreasing correction. Thus, the rotation speed ωmg of the motor 30 is increased when the drive wheels 52 are slipping, and the rotation speed ωmg of the motor 30 is decreased when the drive wheels 52 are gripping the road. That is, in the vibration suppression control, the processor 11 corrects the torque so the rotation speed ωmg of the motor 30 approaches the rotation speed ωt of the drive wheels 52. Therefore, it is possible to suppress the torsion of the drive shaft 50 and suppress vibration caused by torsional resonance.

Depending on when the speed-increasing correction and the speed-decreasing correction is switched, torsional resonance may increase. In this regard, in the control device 10, the processor 11 performs switching between the speed-increasing correction and the speed-decreasing correction by using the prediction result obtained with the learned model. Therefore, the processor 11 can perform the speed-increasing correction so as to increase the rotation speed ωmg of the motor 30 in accordance with when the drive wheel 52 slips based on the prediction result.

Advantages of Present Embodiment (1) The control device 10 can suppress vibration due to torsional resonance by switching between the speed-increasing correction and the speed-decreasing correction when appropriate using a prediction result.

(2) The lower the friction coefficient of the road surface, the more likely the drive wheel 52 will slips. When the drive wheel 52 is slipping, the vehicle is less likely to accelerate even if the rotation speed ωt of the drive wheel 52 increases. Thus, the relationship of the rotation speed ωt of the drive wheel 52 and the acceleration of the vehicle in the front-rear direction is data including information on the frictional coefficient of the road surface. The explanatory variable includes data of the acceleration of the vehicle in the front-rear direction. Therefore, the control device 10 can make further accurate predictions reflecting the difference in the friction coefficient of the road surface by using the learned model.

(3) As the torque of the motor 30 decreases, the torsion of the drive shaft 50 when the vehicle is traveling on an uneven road decreases. The processor 11 performs the vibration suppression control while performing the torque-down control so that the torque of the motor 30 is smaller when the vehicle is traveling on an uneven road than when the vehicle is traveling on an even road.

MODIFIED EXAMPLE

The present embodiment can be modified as follows: The present embodiment and the following modifications can be combined with each other as long as there is no technical contradiction.

In the above-described embodiment, an example in which a learned model that predicts the vertical load y of the drive wheel 52 after the specified time is used. In this respect, the learned model can be a model for predicting whether the drive wheel 52 will be slipping on the road or gripping the road after a specified time. In this case, the training data X_tr may be data including data indicating whether the drive wheel 52 is slipping on the road or gripping the road as a correct answer label. The data indicating whether the drive wheel 52 is slipping on the road or gripping the road may be, for example, data of a result determined based on whether the vertical load y is greater than or equal to a third threshold value or data of a result determined by a person analyzing data of the wheel speed sensor. The same advantages as the above-described embodiment can also be obtained when the determination process is performed using a learned model that predicts whether the drive wheel 52 is slipping or gripping the road after such predetermined time.

The learned model is not limited to the LSTM neural network. The learned model may be learned using another machine learning method such as a decision tree or a regression model. In the above-described embodiment, the input data X(1) to X(10) are input to the LSTM neural network in chronological order to calculate the vertical load y. In contrast, for example, a convolutional neural network may be used as the learned model. In this case, the information of the input data X(1) to X(10) is converted into data in the form of a matrix of four rows and ten columns, which is input to the convolutional neural network to calculate the vertical load y.

Although an example in which the explanatory variable includes the data of the acceleration in the front-rear direction of the vehicle has been described, the explanatory variable does not have to be included in the data of the acceleration in the front-rear direction of the vehicle.

By including the data of the acceleration in the vertical direction of the vehicle in the explanatory variable, it becomes possible to more accurately predict the vertical load y and to more accurately predict whether the drive wheel 52 is slipping or gripping the road.

The data of the accelerator opening degree may be included in the explanatory variable. By including the data of the accelerator opening degree in the explanatory variable, it is possible to more accurately predict the vertical load y or more accurately predict whether the drive wheel 52 is slipping or gripping the road.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an electric vehicle configured to drive a drive wheel with a motor, the controller comprising:
    a processor; and
    a storage device that stores a learned model learned through machine learning, wherein
    the processor is configured to perform vibration suppression control that suppresses vibration caused by torsional resonance of a drive shaft when the electric vehicle is traveling on an uneven road,
    the learned model is a model configured to predict a vertical load of the drive wheel after a specified time by executing a calculation using, as an input, time-series data for a specified period of explanatory variables including a rotation speed of the motor, a torque generated by the motor, and a rotation speed of the drive wheel,
    the processor, in the vibration suppression control, uses a prediction result obtained with the learned model to determine whether to perform speed-increasing correction for generating a positive torque with the motor or speed-decreasing correction for generating a negative torque with the motor, and
    the processor, in the vibration suppression control, switches between the speed-increasing correction and the speed-decreasing correction based on the determination of whether to perform the speed-increasing correction or the speed-decreasing correction to increase the rotation speed of the motor when the drive wheel is slipping on a road and decrease the rotation speed of the motor when the drive wheel is gripping the road.

2. The controller for an electric vehicle according to claim 1, wherein the explanatory variable includes data of acceleration in a front-rear direction of the electric vehicle.

3. The controller for an electric vehicle according to claim 1, wherein when the electric vehicle is traveling on an uneven road, the processor is configured to perform the vibration suppression control while performing torque-down control so that the torque of the motor becomes smaller than that when the electric vehicle is traveling on an even road.

4. The controller for an electric vehicle according to claim 3, wherein the processor is configured to reduce the torque of the motor by setting an upper limit value to a target value of the torque and limiting the torque of the motor in the torque-down control.

5. A controller for an electric vehicle configured to drive a drive wheel with a motor, the controller comprising:
    a processor; and
    a storage device that stores a learned model learned through machine learning, wherein
    the processor is configured to perform vibration suppression control that suppresses vibration caused by torsional resonance of a drive shaft when the electric vehicle is traveling on an uneven road,
    the learned model is a model configured to predict whether the drive wheel is slipping on a road or gripping the road after a specified time by executing a calculation using, as an input, time-series data for a specified period of explanatory variables including a rotation speed of the motor, a torque generated by the motor, and a rotation speed of the drive wheel,
    the processor, in the vibration suppression control, uses a prediction result obtained with the learned model to determine whether to perform speed-increasing correction for generating a positive torque with the motor or speed-decreasing correction for generating a negative torque with the motor, and
    the processor, in the vibration suppression control, switches between the speed-increasing correction and the speed-decreasing correction based on the determination of whether to perform the speed-increasing correction or the speed-decreasing correction to increase the rotation speed of the motor when the drive wheel is slipping on the road and decrease the rotation speed of the motor when the drive wheel is gripping the road.

* * * * *